(12) United States Patent
Kodama et al.

(10) Patent No.: US 10,778,060 B2
(45) Date of Patent: Sep. 15, 2020

(54) MOTOR

(71) Applicant: Nidec Corporation, Kyoto (JP)

(72) Inventors: Mitsuo Kodama, Kyoto (JP); Yuya Saito, Kyoto (JP); Shingo Fukumoto, Kyoto (JP); Chiharu Kobayashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 40 days.

(21) Appl. No.: 16/323,037

(22) PCT Filed: Aug. 9, 2017

(86) PCT No.: PCT/JP2017/028976
§ 371 (c)(1),
(2) Date: Feb. 4, 2019

(87) PCT Pub. No.: WO2018/030479
PCT Pub. Date: Feb. 15, 2018

(65) Prior Publication Data
US 2019/0173350 A1    Jun. 6, 2019

(30) Foreign Application Priority Data

Aug. 12, 2016    (JP) ................................ 2016-158338

(51) Int. Cl.
*H02K 11/00*    (2016.01)
*H02K 5/173*    (2006.01)
(Continued)

(52) U.S. Cl.
CPC ............ *H02K 5/1732* (2013.01); *H02K 3/522* (2013.01); *H02K 5/04* (2013.01); *H02K 5/22* (2013.01);
(Continued)

(58) Field of Classification Search
CPC ............ H02K 5/225; H02K 5/04; H02K 5/15; H02K 5/1732; H02K 11/30; H02K 3/522; H02K 5/22; H02K 7/083; H02K 2203/06
(Continued)

(56) References Cited

U.S. PATENT DOCUMENTS 2,406,947 A * 9/1946 Harlamoff ........... F04D 13/0653
                                                                    415/111
3,295,083 A * 12/1966 Victor ................... H02K 24/00
                                                                    336/30
(Continued)

FOREIGN PATENT DOCUMENTS

| JP | 2004-215368 A | 7/2004 |
|----|---------------|--------|
| JP | 2016-077069 A | 5/2016 |

OTHER PUBLICATIONS

Official Communication issued in International Patent Application No. PCT/JP2017/028976, dated Nov. 7, 2017.

*Primary Examiner* — Thanh Lam
(74) *Attorney, Agent, or Firm* — Keating & Bennett

(57) ABSTRACT

A motor includes a rotor including a shaft, a stator, an upper bearing supporting an upper side of the shaft, a lower bearing supporting a lower side of the shaft, a bearing holder supporting the upper bearing, a housing accommodating the rotor, the stator, and the bearing holder and including an opening on an upper side, and a controller electrically connected to coil lead wires, and having an electronic component mounted thereon. An outer circumferential surface of the bearing holder is fixed while contacting an inner circumferential surface of the housing, and the bearing holder includes a notch cutout extending inward from the outer circumferential surface, and at least one of a the coil lead wires extends upward through the notch.

9 Claims, 16 Drawing Sheets

(51) Int. Cl.
*H02K 11/30* (2016.01)
*H02K 5/22* (2006.01)
*H02K 5/04* (2006.01)
*H02K 3/52* (2006.01)
*H02K 7/08* (2006.01)

(52) U.S. Cl.
CPC .......... *H02K 7/083* (2013.01); *H02K 11/30* (2016.01); *H02K 2203/06* (2013.01)

(58) Field of Classification Search
USPC .............................................. 310/71, 89–90
See application file for complete search history.

(56) References Cited

U.S. PATENT DOCUMENTS

| | | | | |
|---|---|---|---|---|
| 4,476,407 | A * | 10/1984 | Hildebrandt | H02K 3/50 |
| | | | | 200/80 R |
| 7,663,287 | B2 * | 2/2010 | Haga | H02K 3/325 |
| | | | | 310/260 |
| 8,138,644 | B2 * | 3/2012 | Kataoka | H02K 11/21 |
| | | | | 310/260 |
| 2012/0286604 | A1 | 11/2012 | Abe et al. | |
| 2014/0009041 | A1 | 1/2014 | Kawasaki et al. | |
| 2018/0248438 | A1 * | 8/2018 | Ogawa | H02K 3/50 |
| 2019/0341749 | A1 * | 11/2019 | Ogawa | H02K 5/225 |

\* cited by examiner

MOTOR

BACKGROUND OF THE INVENTION

1. Field of the Invention

The present invention relates to a motor.

2. Description of the Related Art

Conventionally, in a motor including a housing that covers a whole while supporting one (for example, a lower side) of bearings of a rotor, and a cover motor (flange) that supports the other (for example, an upper side) bearing, there is a motor in which the cover motor is fixed to an inside of the housing by shrink fitting or press fitting. For example, Japanese Unexamined Patent Publication No. 2016-077069 and Japanese Unexamined Patent Publication No. 2014-017955 disclose such a motor.

In the motor in which the cover motor is fixed to the inside of the housing, sometimes a control board is further disposed inside the housing. In such motors, the control board and a coil lead wire of the motor are electrically connected to each other.

For this reason, a through-hole is made at a proper position of the cover motor to draw the coil lead wire, which allows the electric connection between the control board and the coil lead wire of the motor.

However, in the conventional configuration in which the through-hole is made at the proper position of the cover motor to draw the coil lead wire, it is necessary to dispose the control board according to the position of the coil lead wire to electrically connect the coil lead wire and the control board. It is necessary to determine the disposition of the control board according to the position of the coil lead wire or to determine the disposition of an electronic component mounted on the control board, so that there is restriction on the disposition of the control board and the disposition of the electronic component.

SUMMARY OF THE INVENTION

According to one aspect of the present disclosure, a motor includes: a rotor including a shaft centered on a center axis extending in one direction; a stator surrounding the rotor around an axis and including a plurality of coils; an upper bearing supporting an upper side of the shaft; a lower bearing supporting a lower side of the shaft; a bearing holder supporting the upper bearing; a housing accommodating the rotor, the stator, and the bearing holder and including an opening on an upper side; and a controller electrically connected to the plurality of coil lead wires, and having an electronic component mounted thereon. An outer circumferential surface of the bearing holder is fixed while contacting with an inner circumferential surface of the housing, and the bearing holder includes at least one notch cutout extending inward from the outer circumferential surface, and at least one of a plurality of coil lead wires which respectively extend from the plurality of coils passes upward through the notch.

In the first aspect of the present disclosure, the controller and the coil lead wire are able to be connected to each other in a vicinity of the outermost circumference on the inside of the housing.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, an exemplary embodiment of the invention will be described with reference to the drawings. However, the following embodiment is merely an example of the present invention, but does not interpret the technical scope of the present invention to a limited extent. In each of the drawings, an identical component is denoted by an identical reference sign, and sometimes the description is omitted.

In the following description, a center axis of rotation of a rotor in a motor is denoted by a reference sign C. A direction in which the center axis C extends is defined as a vertical direction. However, the vertical direction in the description is a term used merely for the description, and does not limit an actual positional relationship or the direction. That is, a gravity direction is not necessarily a downward direction. In the description, a direction parallel to a rotation axis of the motor is referred to as an "axial direction", a direction orthogonal to the rotation axis of the motor is referred to as a "radial direction", and a direction along an arc centered on the center axis of the motor is referred to as a "circumferential direction".

In the description, the term "extending axially" includes not only a state of extending strictly in the axial direction but also a state of extending in a direction inclined with respect to the axial direction by an angle less than or equal to 45 degrees. Similarly, in the description, the term "extending radially" includes not only a state of extending strictly in the radial direction but also a state of extending in a direction inclined with respect to the radial direction by the angle less than 45 degrees.

Figure 1:
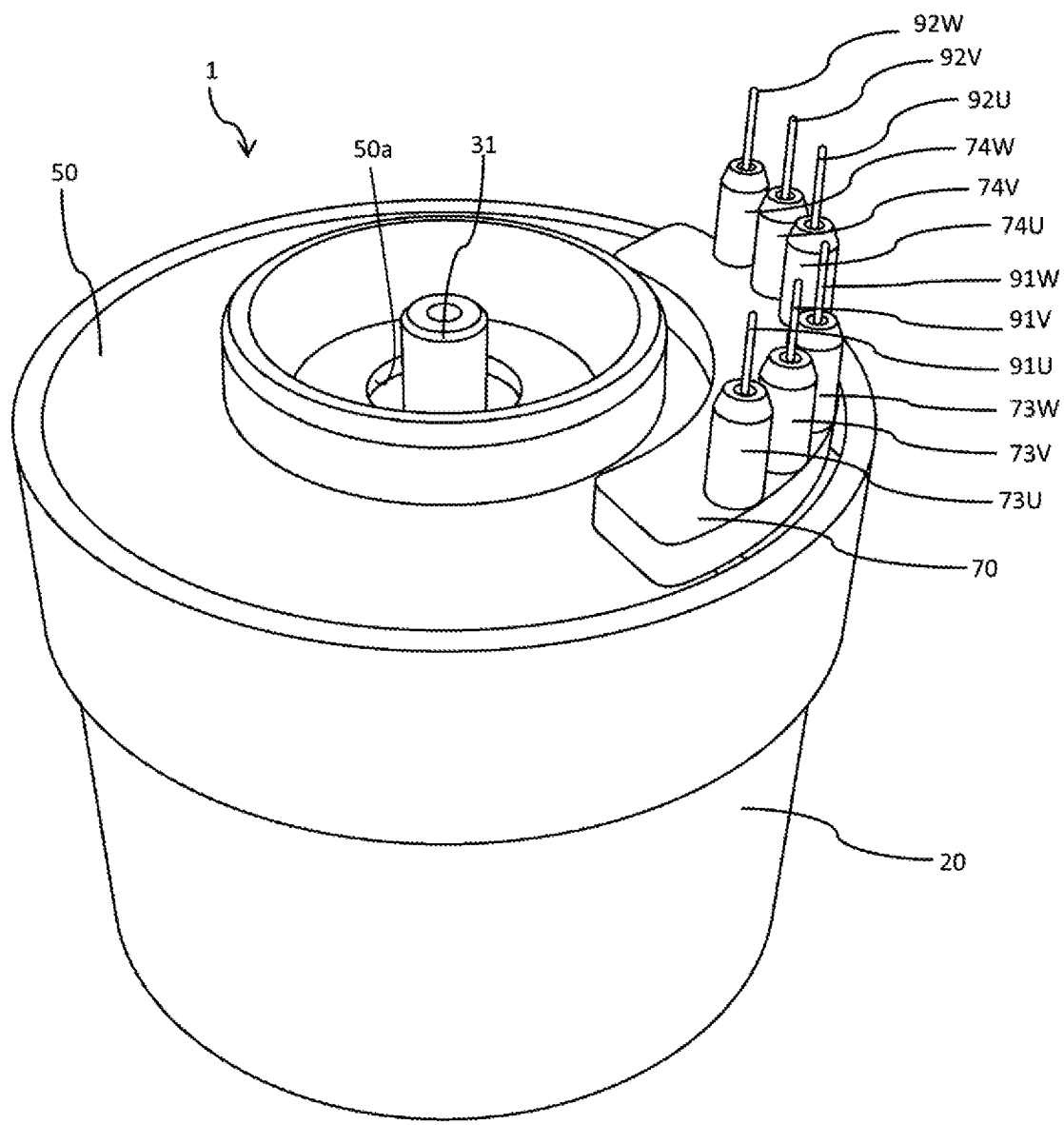
FIG. 1 is a perspective view illustrating an external appearance of a motor according to an example embodiment of the present disclosure.
Figure 2:
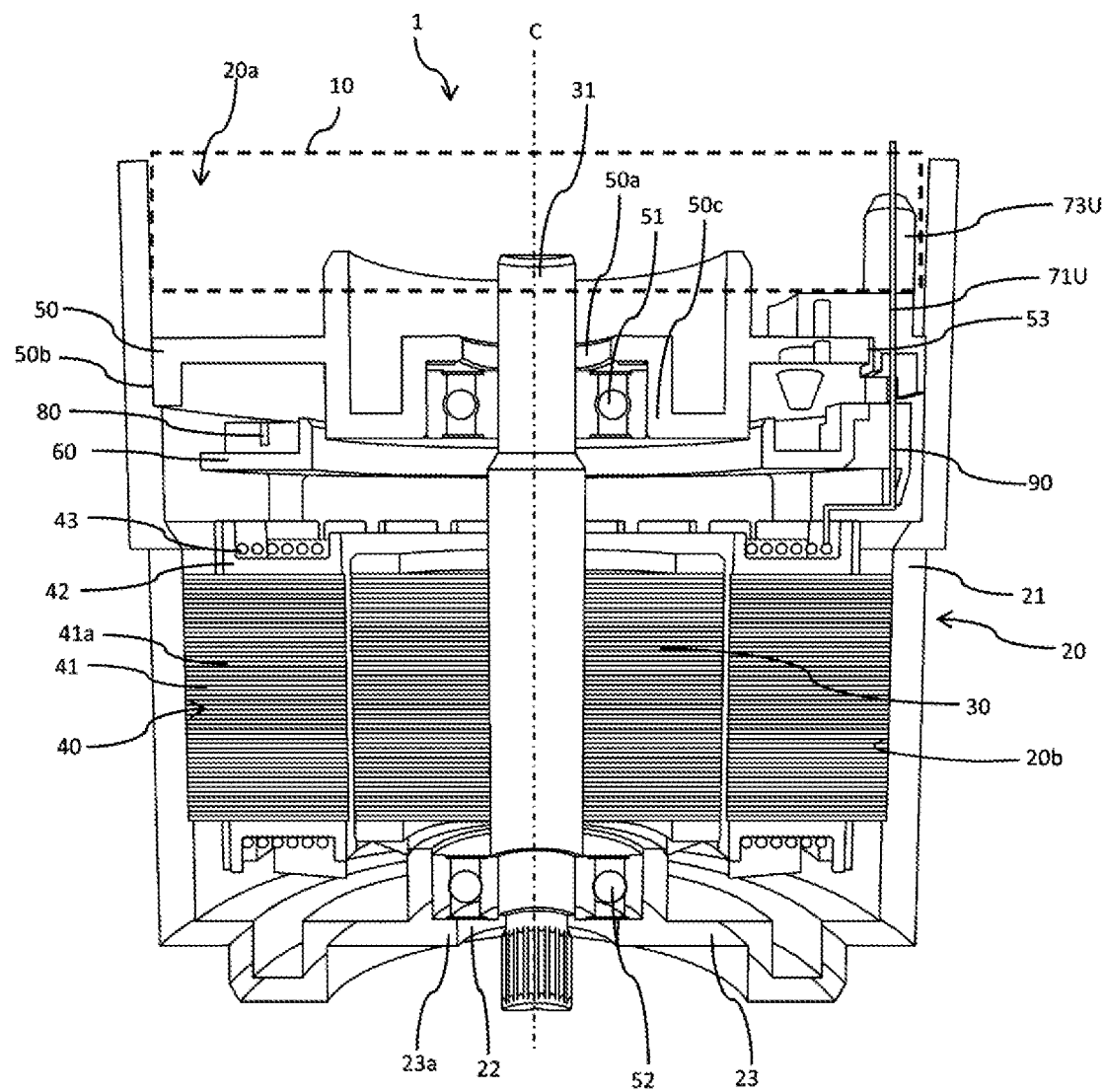
FIG. 2 is a sectional view of the motor.
Figure 3:
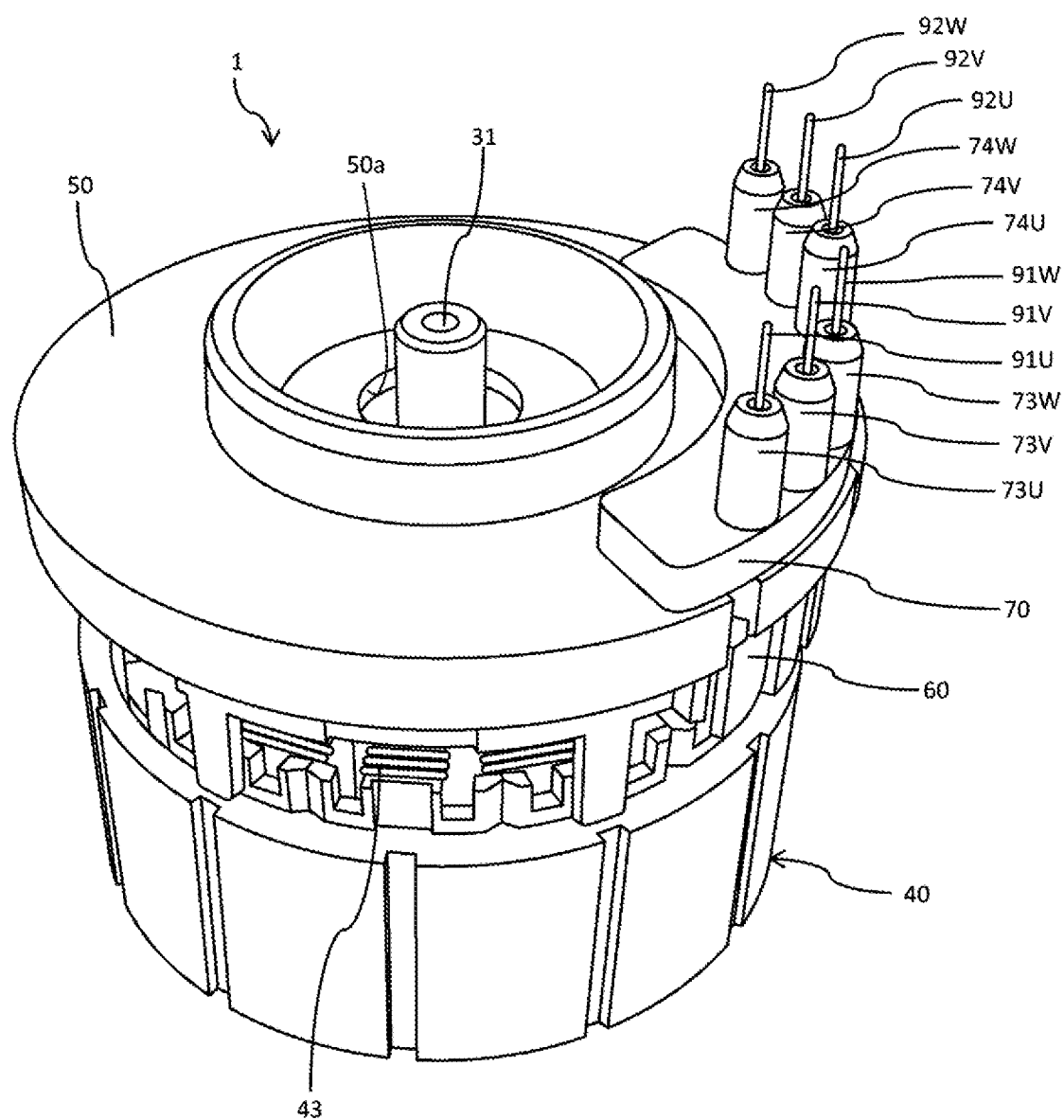
FIG. 3 is a perspective view illustrating a state in which a housing is removed from the motor.
Figure 4:
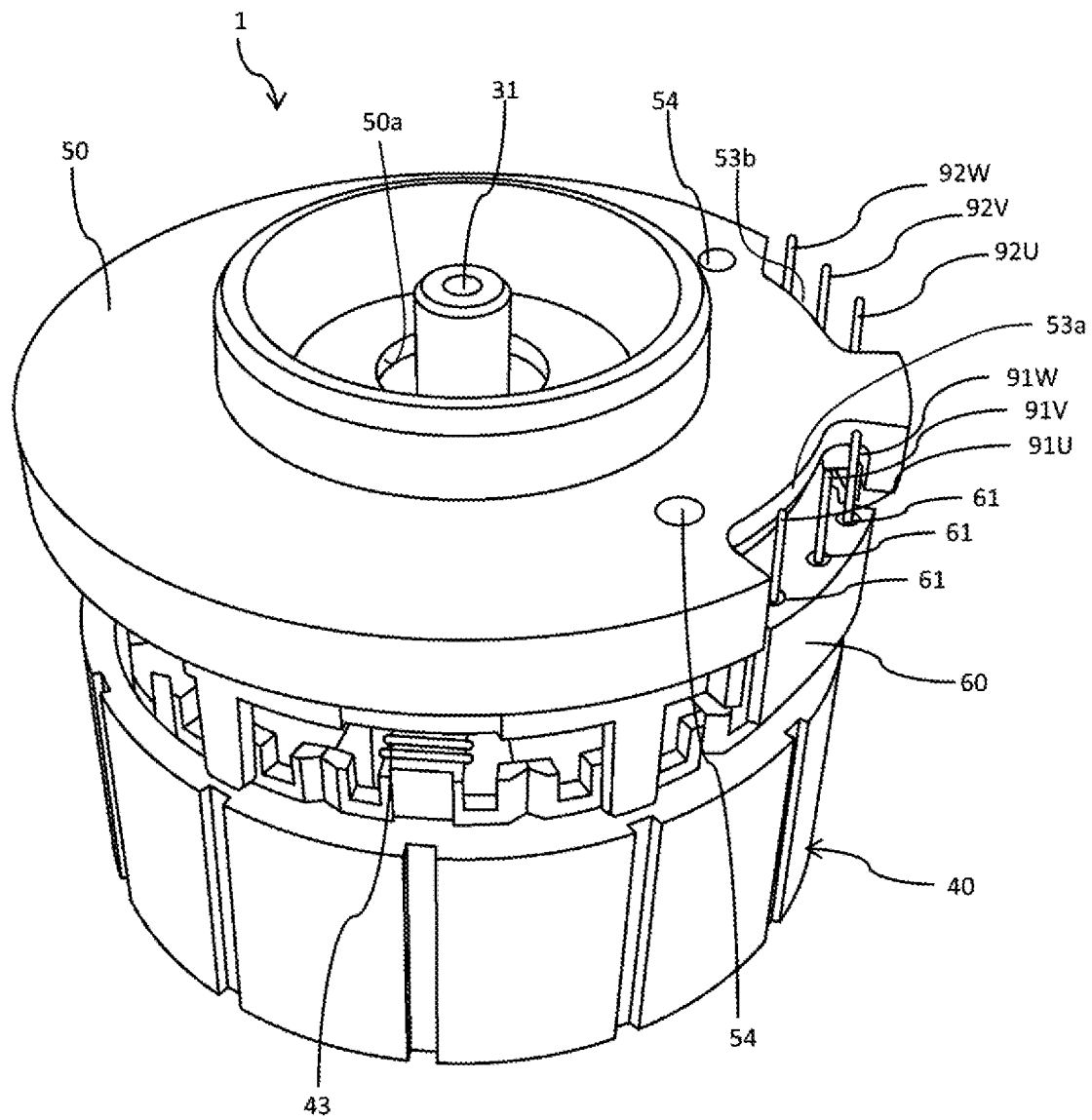
FIG. 4 is a perspective view illustrating the state in which the housing and a coil lead wire supporting member are removed from the motor.

FIG. 1 is a perspective view illustrating an external appearance of a motor 1 according to an embodiment. FIG. 2 is a sectional view of the motor 1. FIGS. 3 and 4 are perspective views illustrating the external appearance of the motor 1, FIG. 3 illustrates a state excluding a housing, and FIG. 4 illustrates a state excluding the housing and a coil lead wire supporting member. In FIG. 1, a part of an upper side of a housing 20 is not illustrated in order to easily see components of the motor.

As illustrated in FIGS. 1 and 2, the motor 1 includes the housing 20, a rotor 30, a stator 40, a bearing holder 50, an upper bearing 51, a lower bearing 52, a bus bar supporting member 60, a coil lead wire supporting member 70, a bus bar 80, and a controller 10. Coil lead wires 91U, 91V, 91W, 92U, 92V, and 92W (hereinafter, also referred to as "coil lead wires 91U to 91 W" or a "coil lead wire 90") are drawn from the coil lead wire supporting member 70.

The housing 20 includes a housing tube 21 extending vertically in a tubular shape and a housing bottom 23 located at a lower end of the housing tube 21. The housing 20 includes an opening 20a on the upper side of the housing 20. The housing tube 21 has a cylindrical shape centered on a center axis C. The bearing holder 50 is disposed in the housing tube 21. In the embodiment, the bearing holder 50 has a substantial disc shaped. An inner circumferential surface 20b of the housing 20 contacts with an outer circumferential surface 50b of the bearing holder 50 and an outer circumferential surface of the stator 40, and the housing 20 is fixed to the bearing holder 50 and the stator 40. The coil lead wire supporting member 70 and the controller 10 are disposed inside the housing 20 and above the bearing holder 50. More particularly, a part of a lower side of the coil lead wire supporting member 70 invades into a notch 53 (to be described later) of the bearing holder 50.

The housing tube 21 does not necessarily have the cylindrical shape, but may have any shape such as a box shape as long as the stator 40 and the bearing holder 50 can be fixed to the inner circumferential surface of the holder tube 21. The housing tube 21 may have a combined shape of the cylindrical shape and another shape such as a box shape. The inner circumferential surface 20b of the housing tube 21 needs not to contact with the stator 40 and the bearing holder 50 over the entire circumference, but a part of the inner circumferential surface 20b may contact with the stator 40 and the bearing holder 50.

The housing bottom 23 is disposed below the stator 40, and includes a lower bearing support 23a supporting the lower bearing 52 and an output shaft hole 22 axially penetrating the holder bottom 23.

The rotor 30 includes the shaft 31. In the embodiment, the shaft 31 has a substantially columnar shape. The shaft 31 extends vertically along the center axis C. The shaft 31 need not be solid but may be hollow.

As illustrated in FIGS. 2 and 3, the stator 40 is disposed inside the housing 20 and radially outside the rotor 30. The stator 40 includes a stator core 41, an insulator 42, and a coil 43. The stator core 41 is formed of a laminated steel plate in which electromagnetic steel plates are axially laminated. In the embodiment, the stator core 41 has an annular shape centered on the center axis C. A plurality of teeth 41a extending radially inward are disposed in an inside surface of the stator core 41. The teeth 41a are circumferentially arranged at intervals in the inside surface of the stator core. The insulator 42 is made of an insulator such as resin, and attached to each tooth 41a. The coil 43 is constructed with a conducting wire wound around each tooth 41a with the insulator 42 interposed therebetween, and disposed in each tooth 41a. As described above, the outer circumferential surface of the stator 40 is fixed to the inner circumferential surface 20b of the housing 20. The stator 40 includes the conducting wire extending from the circumferentially-arranged coils 43. The conducting wire is sometimes referred to as a coil lead wire. However, in the embodiment, the conducting wire is simply referred to as a conducting wire in order to distinguish the conducting wire from the coil lead wires 91U to 92W penetrating the coil lead wire supporting member 70.

Figure 5:
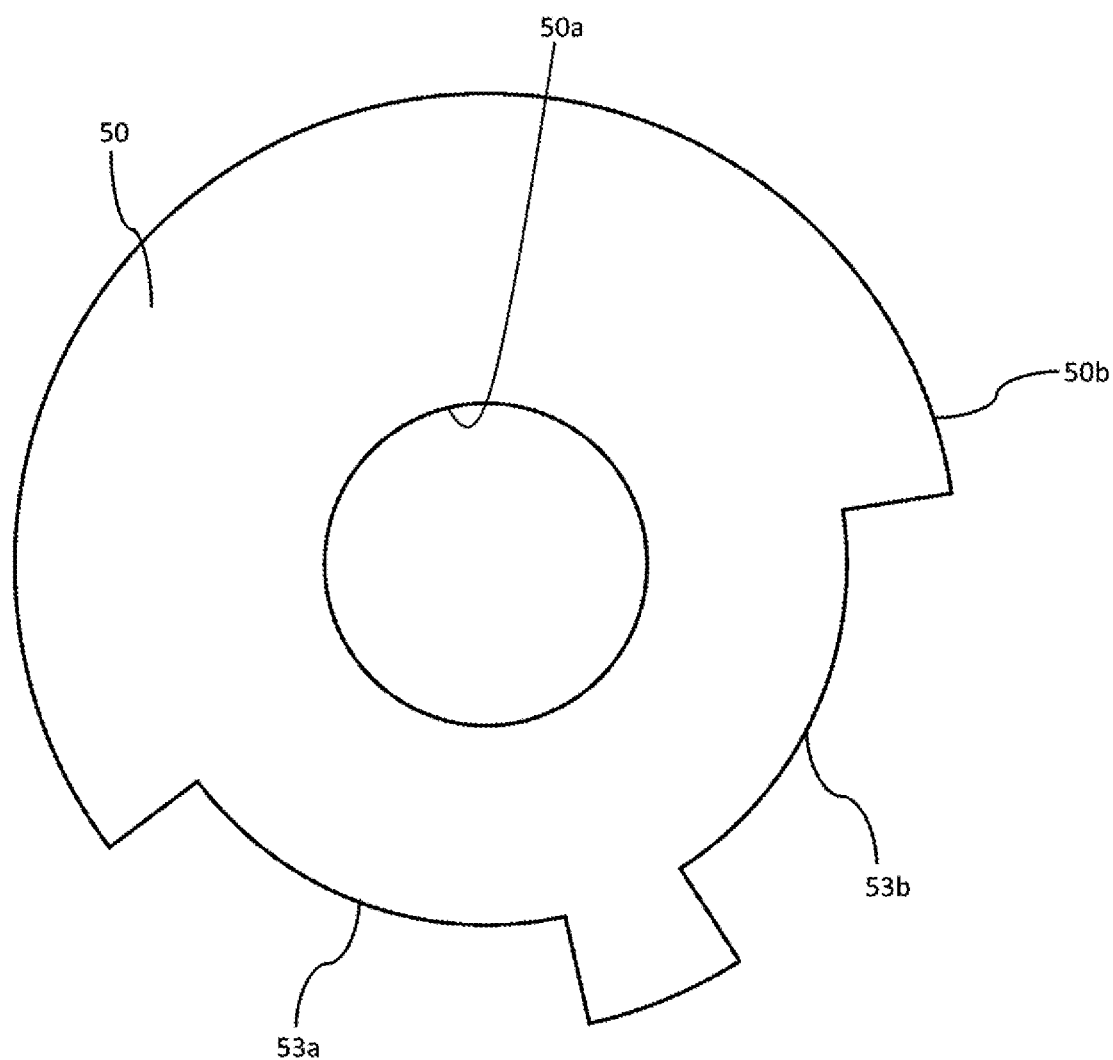
FIG. 5 is a plan view of a bearing holder.

As illustrated in FIGS. 4 and 5, the bearing holder 50 has the disc shape including notches 53a and 53b. As illustrated in FIG. 2, the bearing holder 50 is disposed above the stator 40. The bearing holder 50 includes an opening 50a around the center axis C. The opening 50a is a through-hole axially penetrating the bearing holder 50. A shaft 31 is located inside the opening 50a. The bearing holder 50 supports the upper bearing 51. The outer circumferential surface 50b of the bearing holder 50 contacts with the inner circumferential surface 20b of the housing 20, and the bearing holder 50 is fixed by the housing 20. The bearing holder 50 is fixed to the housing 20 by shrink fitting. The bearing holder 50 may be fixed to the housing 20 by another method such as press fitting. The notches 53a and 53b of the bearing holder 50 have a shape cut out inward from the outer circumferential surface of the bearing holder 50. The "outer circumferential surface" of the bearing holder 50 means the outer circumference of the cylinder centered on the center axis C, and does not includes a surface in which the notches 53a and 53b are opposed to the housing 20.

FIG. 5 is a plan view illustrating the bearing holder 50 of the embodiment when the bearing holder 50 is viewed from above. As illustrated in FIG. 5, the notches 53a and 53b are cut out inward from the outer circumferential surface, and have a shape extending circumferentially. As illustrated in FIG. 3, the coil lead wire supporting member 70 is disposed at the positions of the notches 53a and 53b. In the notches 53a and 53b, the coil lead wires 91U to 92W are passed from the lower side toward the upper side while supported by the coil lead wire supporting member 70.

The notches 53a and 53b are not limited to the shapes of the embodiment, but may be any notch shape as long as at least one of the coil lead wires 91U to 92W passes through the notch from the lower side to the upper side of the bearing holder 50. The notches 53a and 53b may be any notch as long as at least one of the coil lead wires 91U to 92W passes through the notch from the lower side to the upper side of the bearing holder 50, and the coil lead wires 91U to 92W are not necessarily passed. In this case, the coil lead wires 91U to 92W that do not pass through the notch 53a or 53b may be inserted into the hole made in the bearing holder 50 separately from the notch 53a or 53b.

In the embodiment, the upper bearing 51 and the lower bearing 52 are a ball bearing. The upper bearing 51 and the lower bearing 52 support the shaft 31 such that the shaft 31 is circumferentially rotatable about the center axis C. The upper bearing 51 is supported by an upper bearing support 50c of the bearing holder 50. The lower bearing 52 is supported by a lower bearing support 23a of the housing bottom 23. The upper bearing 51 and the lower bearing 52 may be another type bearing other than the ball bearing.

The bus bar supporting member 60 supports the bus bar 80. The bus bar 80 is a conductive member electrically connecting the lead wires led out from the coil 43 to each other. The bus bar supporting member 60 is an insulating resin member, and can prevent the bus bar 80 and the conductive member disposed around the bus bar 80 from coming into contact with each other to generate a short circuit.

Figure 6:
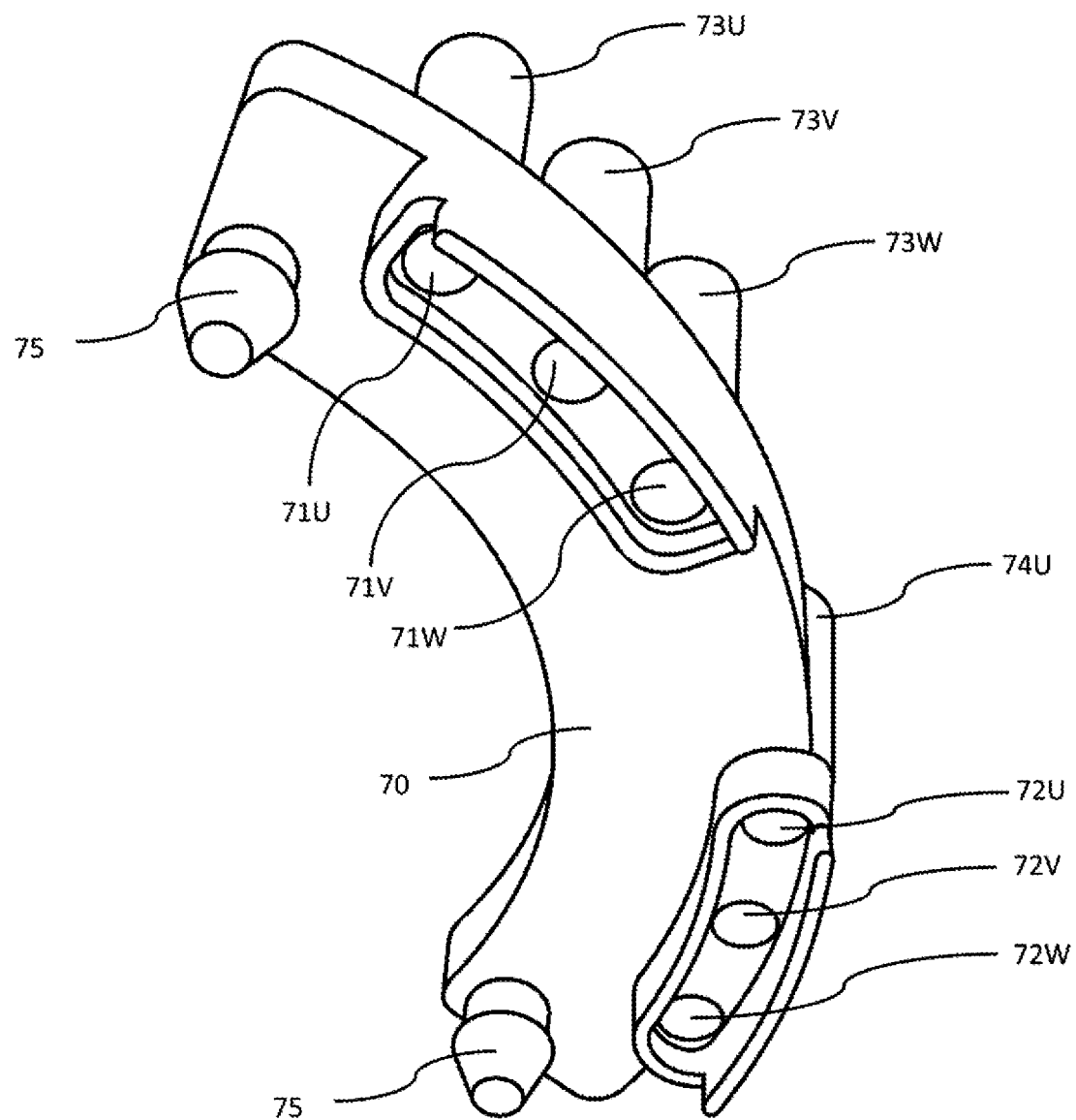
FIG. 6 is a perspective view illustrating the coil lead wire supporting member when the coil lead wire supporting member is viewed from below.

The coil lead wire supporting member 70 is disposed on the upper side of the bearing holder 50, and covers the notches 53a and 53b. At least a part of the coil lead wire supporting member 70 is inserted into the notches 53a and 53b. The coil lead wire supporting member 70 is made of a resin material having insulation (for example, an insulating rubber material), and can prevent the coil lead wires 91U to 92W from coming in contact with each other to generate the short circuit and from contacting with another conductive member to generate the short circuit. As illustrated in FIG. 6, the coil lead wire supporting member 70 includes coil lead wire through-holes 71U, 71V, 71W, 72U, 72V and 72W (hereinafter, sometimes referred to as "coil lead wire through-holes 71U to 72W"). The coil lead wire through-holes penetrate from the lower side to the upper side. The coil lead wire supporting member 70 includes coil lead wire supporting extensions 73U, 73V, 73W, 74U, 74V, and 74W (hereinafter, sometimes referred to as "coil lead wire supporting extensions 73U to 74 W"). The coil lead wire supporting extensions protrude upward. The coil lead wire through-holes 71U to 72W extend from the lower side of the coil lead wire supporting member 70 to the upper ends of the coil lead wire supporting extensions 73U to 74W, respectively.

As illustrated in FIGS. 1 and 2, the coil lead wires 91U to 92W are inserted into the coil lead wire through-holes 71U to 72W from the lower side to the upper side of the bearing holder 50, respectively. The coil lead wire through-holes 71U to 72W are circumferentially arranged into a concentric arc shape centered on the center axis C.

Figure 7:
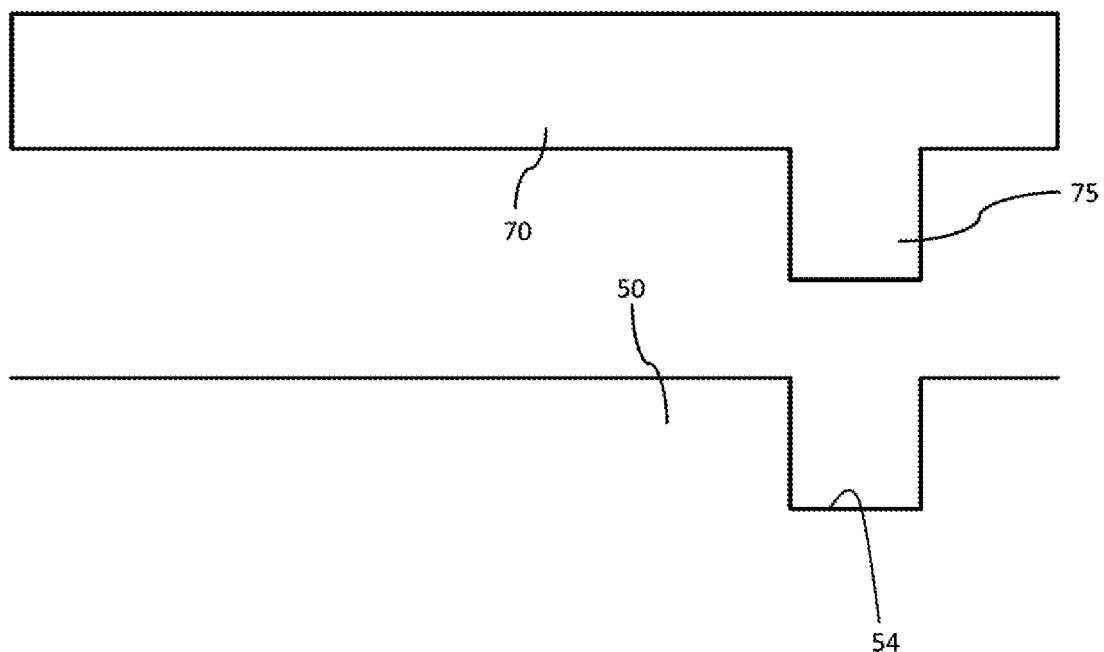
FIG. 7 is a sectional view illustrating a coupling portion between the coil lead wire supporting member and the bearing holder.

FIG. 7 is a sectional view illustrating a coupling portion between the bearing holder 50 and the coil lead wire supporting member 70. As illustrated in FIGS. 6 and 7, the coil lead wire supporting member 70 includes a protrusion 75 on the lower side. The bearing holder 50 includes a recess 54 at an upper position opposed to the protrusion 75. In the embodiment, the protrusion 75 of the coil lead wire supporting member 70 is vertically fitted in the recess 54 of the bearing holder 50. The protrusion 75 is fixed in the recess 54 by light press fitting or the like. Consequently, the coil lead wire supporting member 70 and the bearing holder 50 are firmly fixed to each other.

The coil lead wire supporting member 70 may not necessarily include all of the coil lead wire through-holes 71U to 72W and the coil lead wire supporting extensions 73U to 74W as a single structure. That is, for example, the coil lead wire supporting member 70 may be divided into a first coil lead wire supporting member including the coil lead wire through-holes 71U, 71V, and 71W and the coil lead wire supporting extensions 73U, 73V, and 73W and a second coil lead wire supporting member including the coil lead wire through-holes 72U, 72V and 72W, and the coil lead wire supporting extensions 74U, 74V and 74W. The coil lead wire supporting member 70 may have a configuration in which the coil lead wires 91U to 92W are drawn on the upper side without including the coil lead wire supporting extensions 73U to 74W.

The coil lead wire 90 (91U to 92W) is a conducting wire drawn from the conducting wire of the coil 43. As illustrated in FIG. 2, the coil lead wire 90 (91U to 92W) is drawn from the stator 40, and inserted into the through-hole 61 (see FIG. 4) of the bus bar supporting member 60 and the coil lead wire through-holes 71U to 72W from the lower side toward the upper side. As illustrated in FIG. 2, the coil lead wires 90 (91U to 92W) are electrically connected to the controller 10 by soldering or the like. The motor of the embodiment has a two-system configuration having two pairs of a U-phase, a V-phase, and a W-phase. In driving the motor, current is passed through the coil lead wires 91U to 91W constituting the U-phase, the V-phase, and the W-phase in the first system, and current is also passed through the coil lead wires 92U to 92W constituting the U-phase, the V-Phase, and the W-phase in the second system. With this configuration, in driving the motor, even if energization to the coil of one system is stopped due to a failure of an inverter, the coil of the other system can be energized, so that the motor can be rotated.

Although the motor of the embodiment has the two-system configuration having the two pairs of the U-phase, the V-phase, and the W-phase, any number of systems can be designed. That is, in the motor 1, a configuration of one system or at least three systems can be adopted. In this case, a bearing holder having notches through which the U-phase, the V-phase, and the W-phase coil lead wires pass on the upper side may be used.

The controller 10 is disposed inside the housing 20 and above the bearing holder 50. The controller 10 is a circuit board on which various electronic components such as a switching element are mounted. In the embodiment, for example, the controller 10 is a rigid board. For example, the controller 10 has a rectangular shape having ends on all sides. An external power source or the like (not illustrated) supplies necessary driving power to each of the coil lead wires 91U to 92W through the controller 10. An inverter circuit that drives the motor 1 and the like are mounted on the controller 10. As described above, the coil lead wires 91U to 92W are drawn upward through the notches located radially outside the bearing holder 50. For this reason, when the controller 10 is disposed inside the housing 20, the coil lead wires 91U to 92W can electrically be connected to the vicinity of the end of the controller 10. As a result, a space where the wiring and the electronic component are disposed can widely be secured on the controller 10. The coil lead wire is drawn through the coil lead wire supporting member and the notch, so that a space where the coil lead wire is drawn can be reduced to miniaturize the motor. In the controller 10, a periphery of the position where the coil lead wire and the controller 10 are connected to each other is a region where a temperature tends to be high during energization. However, in the embodiment, the number of notches is one. Each coil lead wire is drawn through one notch, and connected to a position where the coil lead wires are close to each other in the controller 10. Consequently, for example, a plurality of cooling members such as a heat sink can integrally be disposed in the periphery of the region where the coil lead wire and the controller 10 are connected to each other, and a space where the wire and the electronic component can widely be secured.

The controller 10 may not necessarily be disposed inside the housing 20, but may be disposed outside the housing 20. For example, the controller 10 may be disposed on the upper side of the bearing holder 50 and on the radial inside of the inside surface of the housing 20. Even if the controller 10 is disposed in this way, the coil lead wires 91U to 92W can be electrically connected to the vicinity of the end of the controller 10, and a relatively wide disposition space of the controller 10 can be secured.

The motor 1 includes the rotor 30, the stator 40, the upper bearing 51, the lower bearing 52, the bearing holder 50, the housing 20, and the controller 10. The outer circumferential surface 50b of the bearing holder 50 is fixed while contacting with the inner circumferential surface 20b of the housing 20. The bearing holder 50 includes the notches 53a and 53b cut out inward from the outer circumferential surface 50b. The notches 53a and 53b are a notch through which at least one of the plurality of coil lead wires 91U to 92W extending from the plurality of coils passes upward. The number of notches 53a and 53b is not necessarily two, but may be one or at least three.

The motor 1 has the configuration in which at least one of the coil lead wires 91U to 92W passes upward through the notches 53a and 53b. Consequently, the connection position between at least one of the coil lead wires 91U to 92W and the controller 10 can be set to the vicinity of the inside surface of the housing 20, and the space where the wire, the electronic component, and the like are disposed on the controller 10 can widely be secured.

The motor 1 has a coil lead wire supporting member 70 disposed at positions of the notches 53a and 53b. The coil lead wire supporting member 70 includes coil lead wire through-holes 71U to 72W supporting the coil lead wires 91U to 92W, respectively.

In the motor 1, the coil lead wires 91U to 92W can pass through the determined position by the coil lead wire supporting member 70, so that the positioning adjustment with the controller 10 can be facilitated. The shape of the coil lead wire supporting member 70 can be simplified as compared with the case that the member supporting the coil lead wires 91U to 92W is provided in the stator 40.

In the motor 1, the coil lead wire through-holes 71U to 72W of the coil lead wire supporting member 70 are disposed in a concentric arc shape.

In the motor 1, the coil lead wires 91U to 92W can be disposed along the inside surface of the housing 20. For this reason, the space where the electronic component and the like are disposed can be secured in the controller 10.

In the motor 1, the notches 53a and 53b are formed in the bearing holder 50.

In the motor 1, the disposition of the notches can arbitrarily be adjusted as compared with the configuration in which all the coil lead wires 91U to 92W pass through one notch. This enables the connection position between the coil lead wires 91U to 92W and the controller 10 to be easily adjusted to increase a degree of freedom of motor design. A circumferential width between the notches can be widened as compared with the configuration in which one notch is provided for each of the coil lead wires 91U to 92W, so that the configuration of the bearing holder 50 can hardly be deformed or broken.

The motor 1 is a three-phase motor, and has a two-system structure having two pairs of a U-phase, a V-phase, and a W-phase. The coil lead wires 91U to 92W are drawn from the coils of the U-phase, the V-phase, and the W-phase in each system, and the number of the coil lead wires 91U to 92W is six in total. Three coil lead wires of the U-phase, the V-phase and the W-phase constituting one of the systems pass through the notch 53a, and three coil lead wires of the U-phase, the V-phase and the W-phase constituting the other system pass through the notch 53b.

Because the motor 1 has the two-system configuration, the motor 1 has what is called redundancy in which one of the systems operates normally even if the other system does not operate normally. In the motor 1, the coil lead wires 91U to 91W and 92U to 92W of different systems pass through upward as a set. Consequently, the coil lead wires 91U to 92W is easily connected to the controller 10, or the motor is easy to assemble.

The motor 1 is not limited to the embodiment, but includes various configurations conceivable from the embodiment. For example, the motor 1 may adopt the following modifications. The configuration identical to that of the embodiment is denoted by a reference sign, and sometimes the description is omitted.

Figure 8:
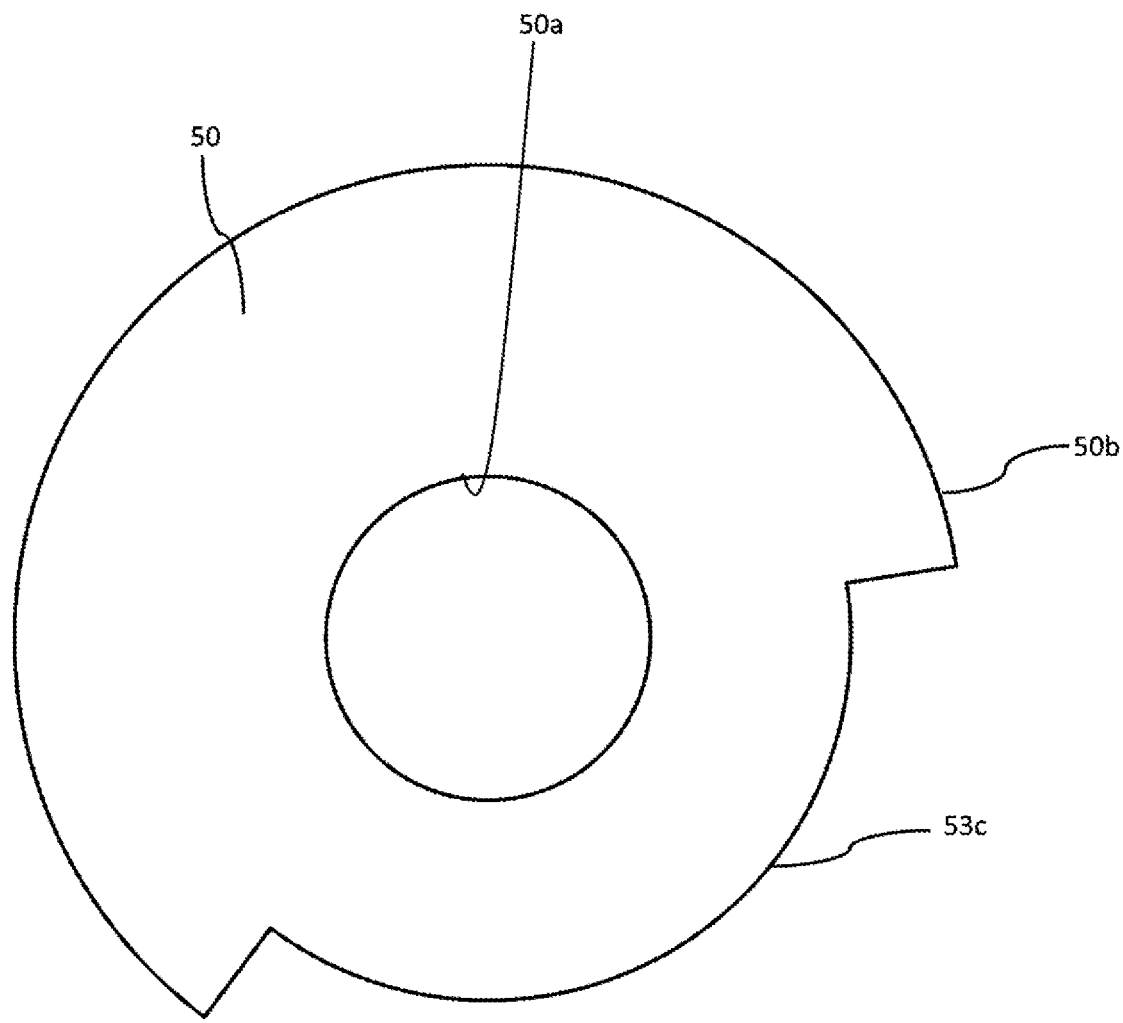
FIG. 8 is a plan view illustrating a bearing holder of a first modification of an example embodiment of the present disclosure.

FIG. 8 is a plan view illustrating the bearing holder 50 according to a first modification of the present invention. As illustrated in FIG. 8, the bearing holder 50 of the first modification has one notch 53c. All the six coil lead wires 91U to 92W pass through the notch 53c from the lower side to the upper side. The coil lead wire supporting member 70 similar to that of the embodiment is disposed at the position of the notch 53c while covering the notch 53c.

In the motor 1 of the first modification, all the coil lead wires 91U to 92W can pass through one notch 53c of the bearing holder 50, so that the process of forming the notch in the bearing holder 50 can be simplified as compared with the configuration in which the bearing holder 50 includes the plurality of notches.

Figure 9:
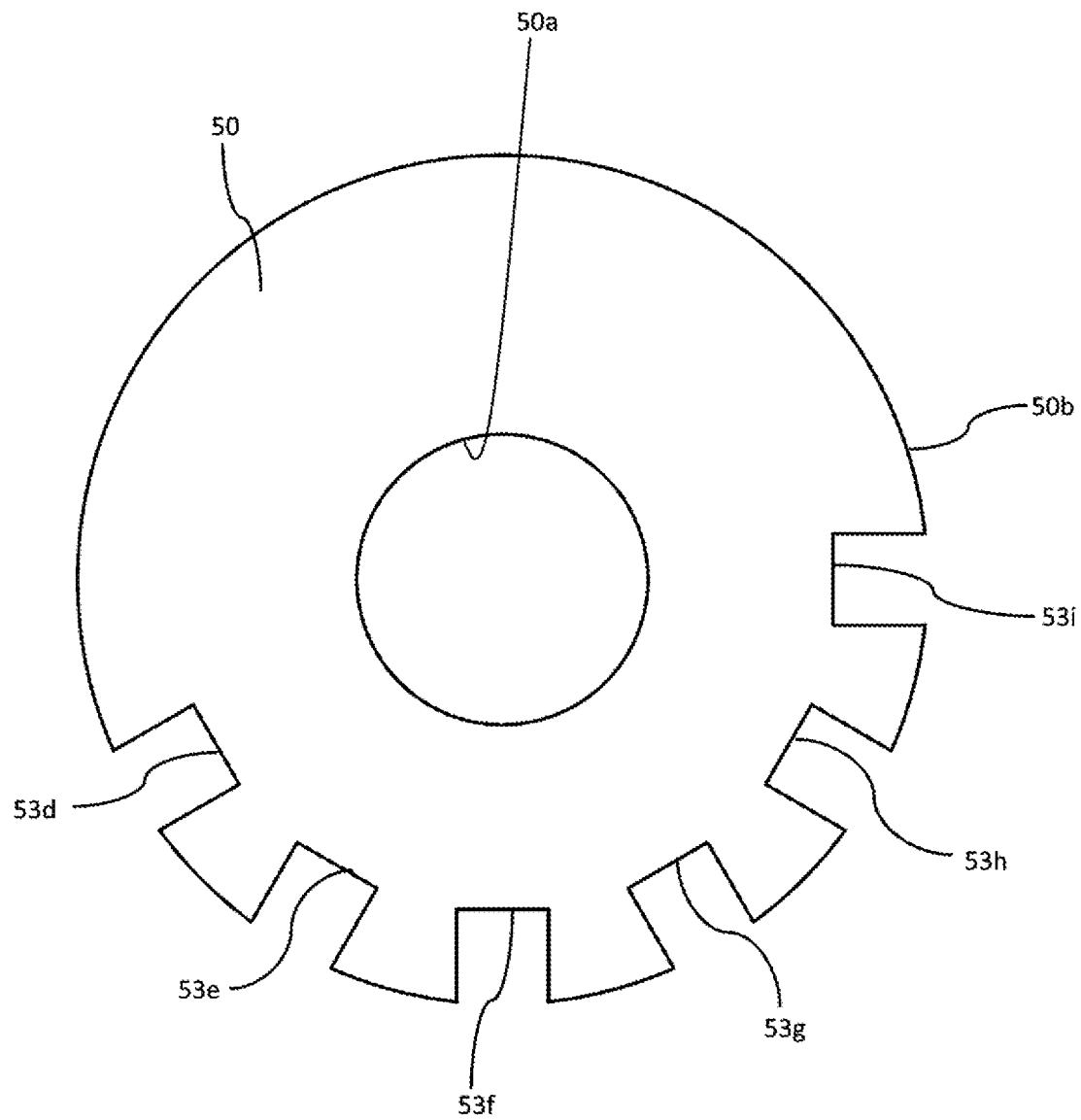
FIG. 9 is a plan view illustrating a bearing holder of a second modification of an example embodiment of the present disclosure.

FIG. 9 is a plan view illustrating the bearing holder 50 according to a second modification of the present invention. As illustrated in FIG. 9, the bearing holder 50 of the second modification includes six notches 53d, 53e, 53f, 53g, 53h, and 53i. The six coil lead wires 91U to 92W pass through the notches 53d to 53i, respectively. Similarly to the embodiment, the coil lead wire supporting member 70 covers the whole notches 53d to 53i. The coil lead wire supporting member 70 need not to cover the notches 53d to 53i in one configuration, and may cover at least two of the notches 53d to 53i.

In the motor 1 of the second modification, a degree of freedom of design can be enhanced as compared with the configuration of the embodiment or the configuration of the first modification. Additionally, a part of the outer circumferential surface of the bearing holder 50 located between the adjacent notches 53d to 53i can be brought into contact with the inner circumferential surface of the housing 20, so that the bearing holder 50 and the housing 20 can firmly be fixed to each other.

Figure 10:
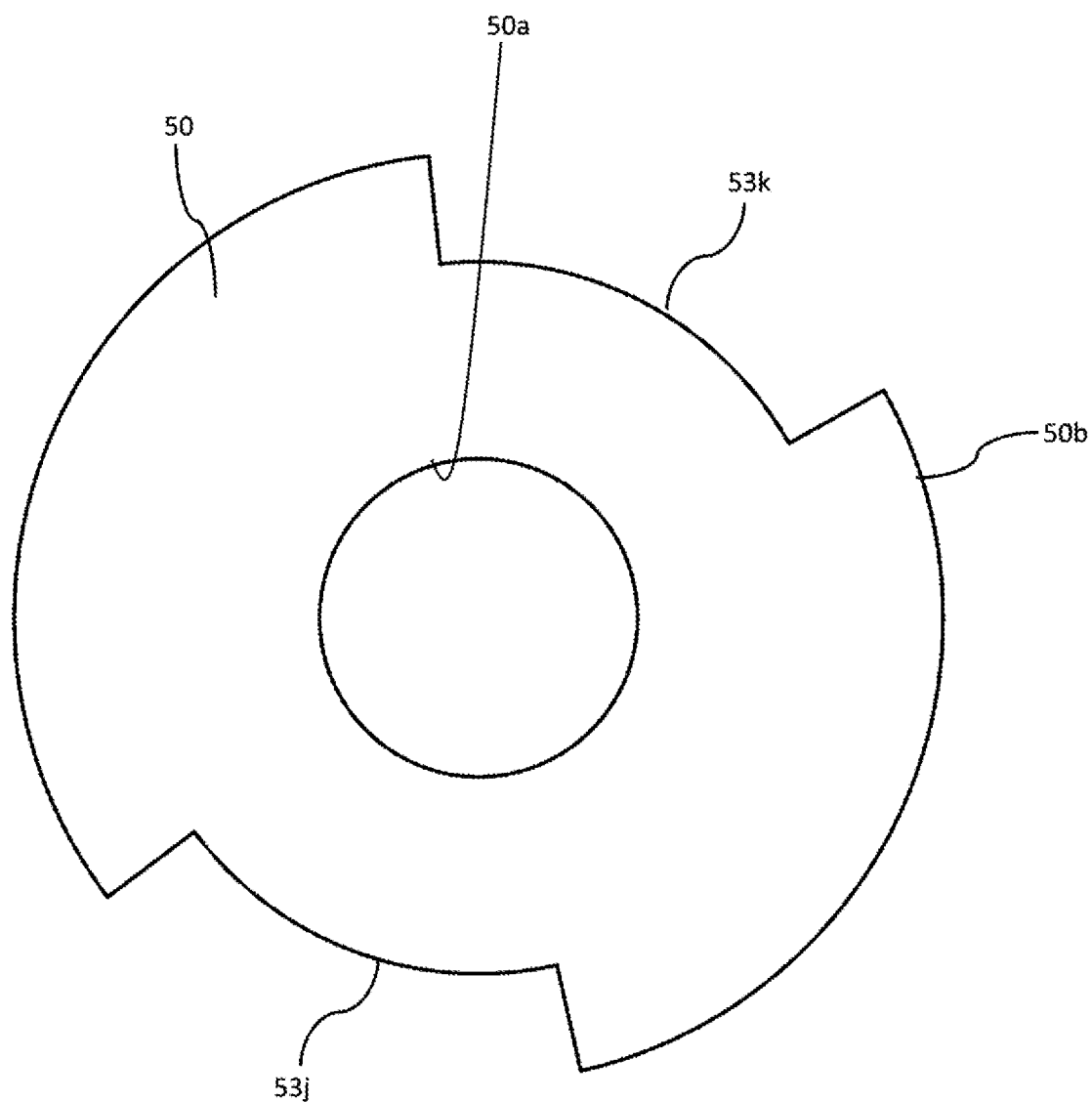
FIG. 10 is a plan view illustrating a bearing holder of a third modification of an example embodiment of the present disclosure.

FIG. 10 is a plan view illustrating the bearing holder 50 according to a third modification of the present invention. As illustrated in FIG. 10, the bearing holder 50 of the third modification includes notches 53j and 53k that are disposed at circumferential positions opposite to each other around the center axis C. The disposition of the notches 53j and 53k can arbitrarily be changed.

In the motor 1 of the third modification, the two notches 53j and 53k included in the bearing holder 50 are circumferentially disposed separately from each other. Consequently, a circumferential distance between the notch 53j and the notch 53k can be lengthened, and the bearing holder 50 and the housing 20 can firmly be fixed to each other. The coil lead wires 91U to 92W are drawn through the notches 53*j* and 53*k*, and electrically connected to the controller 10. The connection places between the controller 10 and the coil lead wires 91U to 92W can be separated from each other by disposing the notches 53*j* and 53*k* as in the third modification. Consequently, the complicated wires due to dense disposition of the electronic components in the controller can be prevented. Because the notches 53*j* and 53*k* are circumferentially disposed separately from each other, in the case that the coil lead wires pass through the notches 53*j* and 53*k*, the connection position between the controller 10 and the coil lead wires drawn from the notches 53*j* and 53*k* and the connection position between the coil lead wire drawn from the notch 53*k* and controller 10 can be disposed separately from each other on the controller 10. Consequently, the electronic components that are connected to the connection positions to serve as a heat source can be disposed separately from each other. As a result, the heat sources can be disposed in a distributed manner in the controller 10, and the electronic component disposed in the controller 10 can be prevented from being destroyed due to heat.

Figure 11:
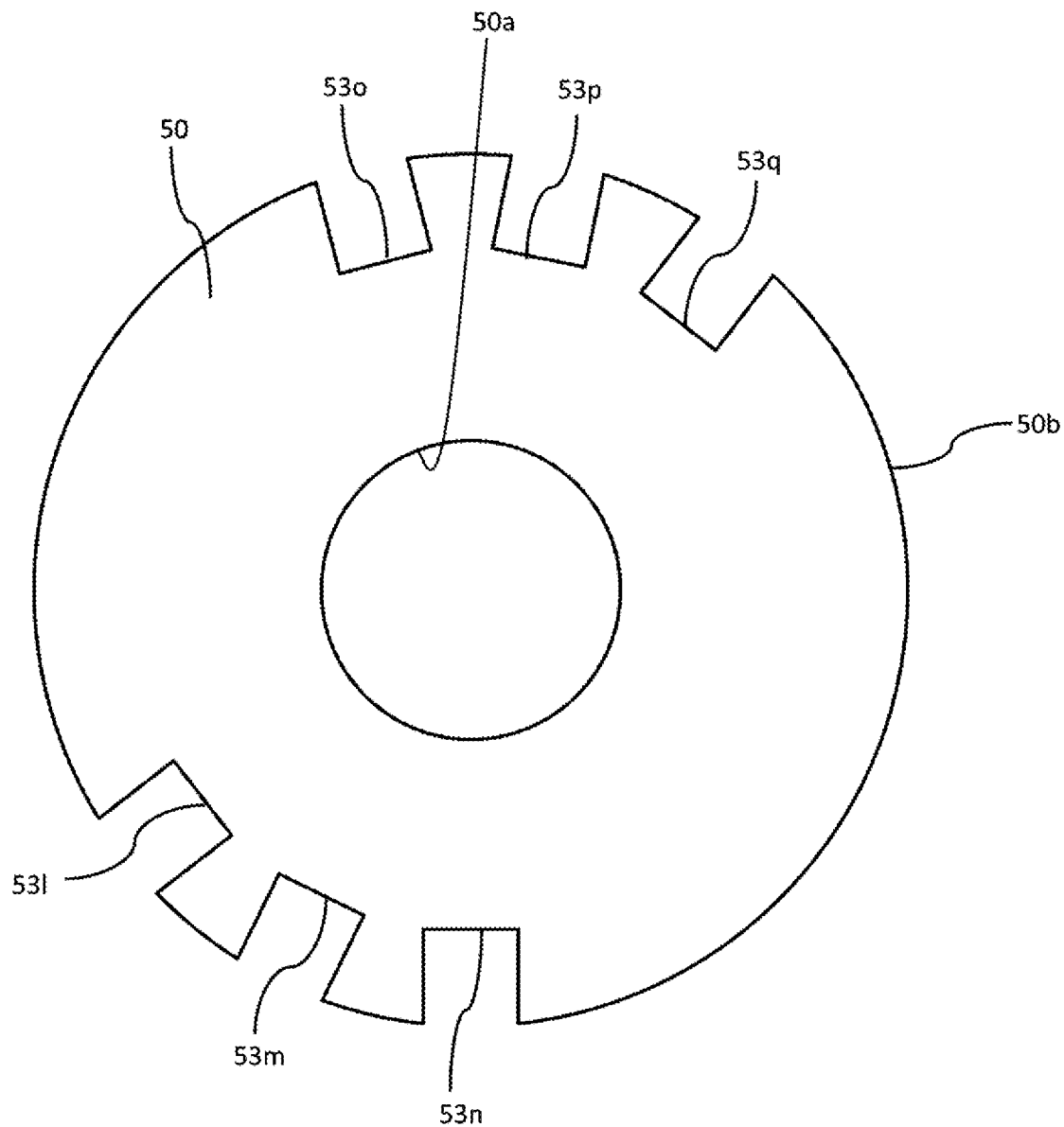
FIG. 11 is a plan view illustrating a bearing holder of a fourth modification of an example embodiment of the present disclosure.

FIG. 11 is a plan view illustrating the bearing holder 50 according to a fourth modification of the present invention. As illustrated in FIG. 11, the bearing holder 50 of the fourth modification includes notches 53*l* to 53*n* and notches 53*o* to 53*q* at circumferential positions opposite to each other around the center axis C. The disposition of the notches 53*l* to 53*q* can arbitrarily be changed.

In the motor 1 of the fourth modification, in the bearing holder 50, the six notches 53*l* to 53*q* are disposed at circumferential positions separated from each other. Consequently, a circumferential distance between the notches can be lengthened, and the bearing holder 50 and the housing 20 can firmly be fixed to each other. The coil lead wires 91U to 92W are drawn through the notches 53*l* to 53*q*, and electrically connected to the controller 10. The connection places between the controller 10 and the coil lead wires 91U to 92W can be separated from each other by disposing the notches 53*l* to 53*q* as in the fourth modification. As a result, the change in disposition of the electronic component mounted in the controller 10 can arbitrarily be facilitated.

Figure 12:
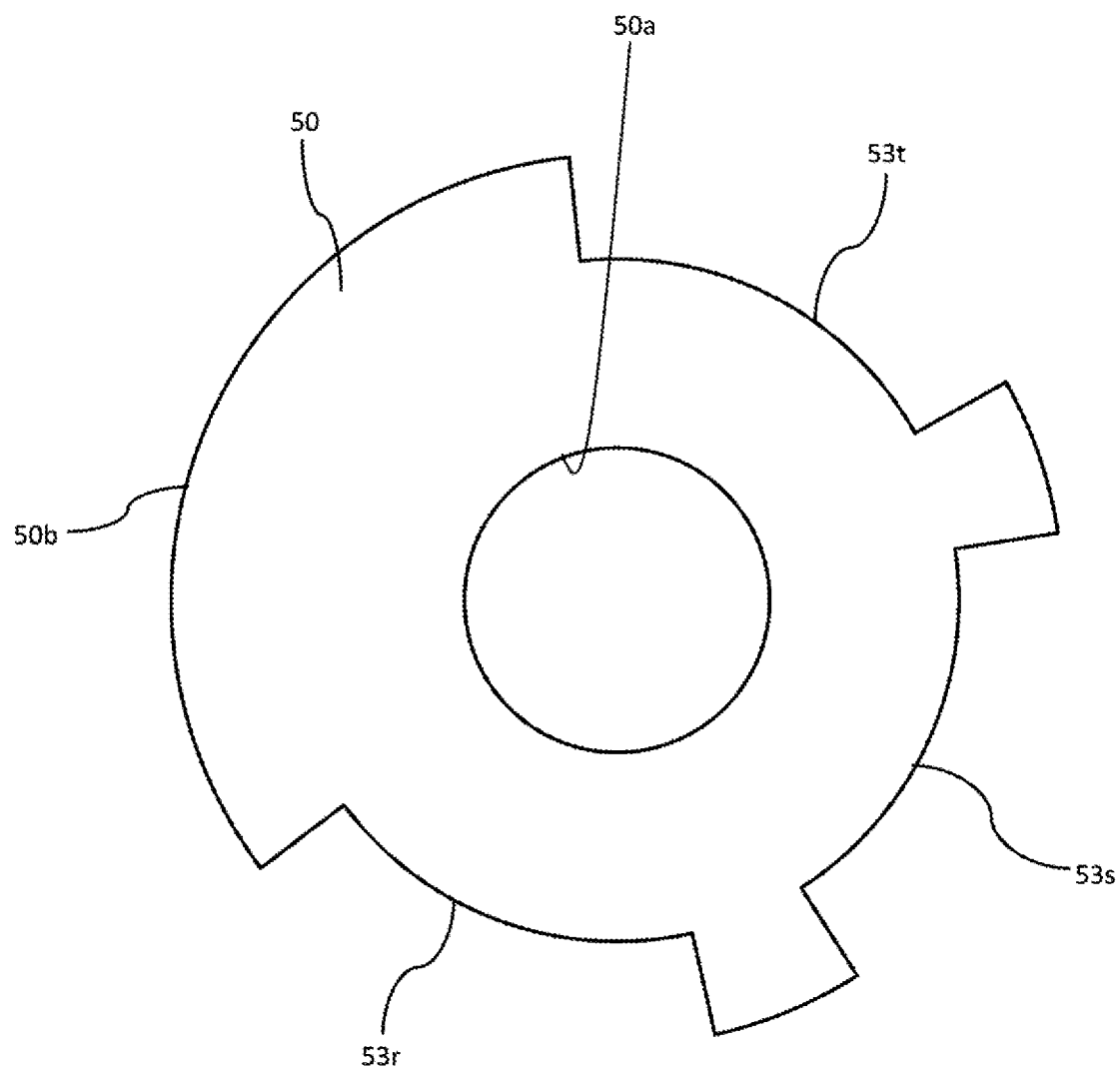
FIG. 12 is a plan view illustrating a bearing holder of a fifth modification of an example embodiment of the present disclosure.

FIG. 12 is a plan view illustrating the bearing holder 50 according to a fifth modification of the present invention. As illustrated in FIG. 12, the bearing holder 50 of the fifth modification includes three notches 53*r* to 53*t*. Each three of the coil lead wires 91U to 92W pass through two of the notches 53*r* to 53*t*, and the coil lead wire does not passed through the remaining one notch.

In the motor of the fifth modification, the bearing holder 50 includes the notch through which the coil lead wire is not drawn. Consequently, for example, the bearing holder 50 of the fifth modification can be used for not only the above structure but also a motor in which a connection positions of the coil lead wires 91U to 92W on the controller 10 is different from that of the fifth modification.

Figure 13:
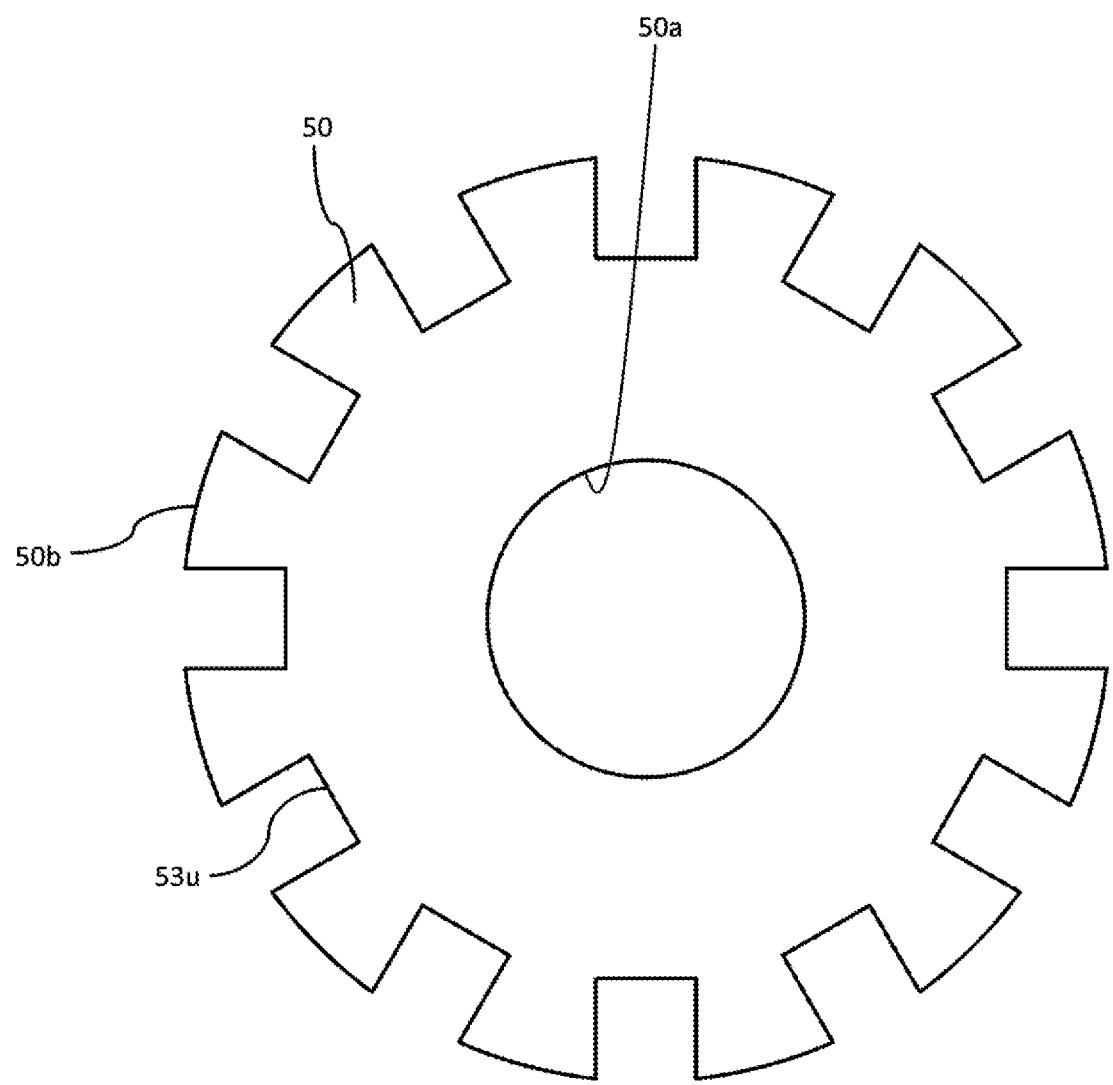
FIG. 13 is a plan view illustrating a bearing holder of a sixth modification of an example embodiment of the present disclosure.

FIG. 13 is a plan view illustrating the bearing holder 50 according to a sixth modification of the present invention. As illustrated in FIG. 13, the bearing holder 50 of the sixth modification includes twelve notches 53*u*, for example. The coil lead wires 91U to 92W passes through six of the twelve notches 53*u*, respectively, and the coil lead wire does not pass through the remaining six notches 53*u*.

In the motor 1 of the sixth modification, the bearing holder 50 includes the notch through which the coil lead wire does not pass, so that the common bearing holder 50 can be used for a motor having the different connection position between the controller 10 and the coil lead wires 91U to 92W, for example.

Figure 14:
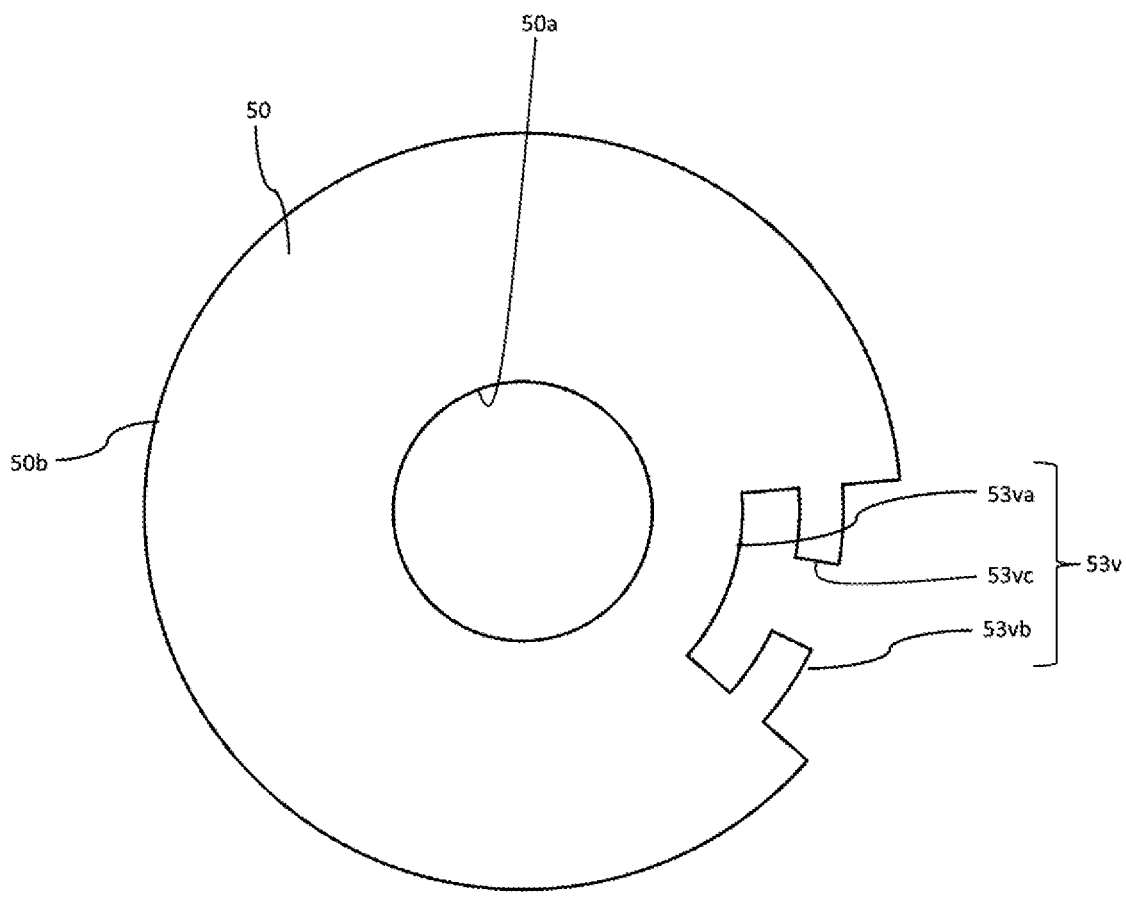
FIG. 14 is a plan view illustrating a bearing holder of a seventh modification of an example embodiment of the present disclosure.

FIG. 14 is a plan view illustrating the bearing holder 50 according to a seventh modification of the present invention. As illustrated in FIG. 14, the bearing holder 50 of the seventh modification includes one notch 53*v*. The notch 53*v* includes an inner circumferential side portion 53*va*, an outer circumferential side portion 53*vb*, and a coupling portion 53*vc*. The outer circumferential side portion 53*vb* has a shape cut out inward from the outer circumferential surface of the bearing holder 50. The coupling portion 53*vc* is a notch located in the side surface on the radially inside of the outer circumferential side portion 53*vb*. The inner circumferential side portion 53*va* is a notch located further radially inside the coupling portion 53*vc*, and has a shape extending circumferentially. For example, three coil lead wires 91U to 91W pass through the inner circumferential side portion 53*va* of the notch 53*v*, and three coil lead wires 92U to 92W pass through the outer circumferential side portion 53*vb* of the notch 53*v*.

Figure 15:
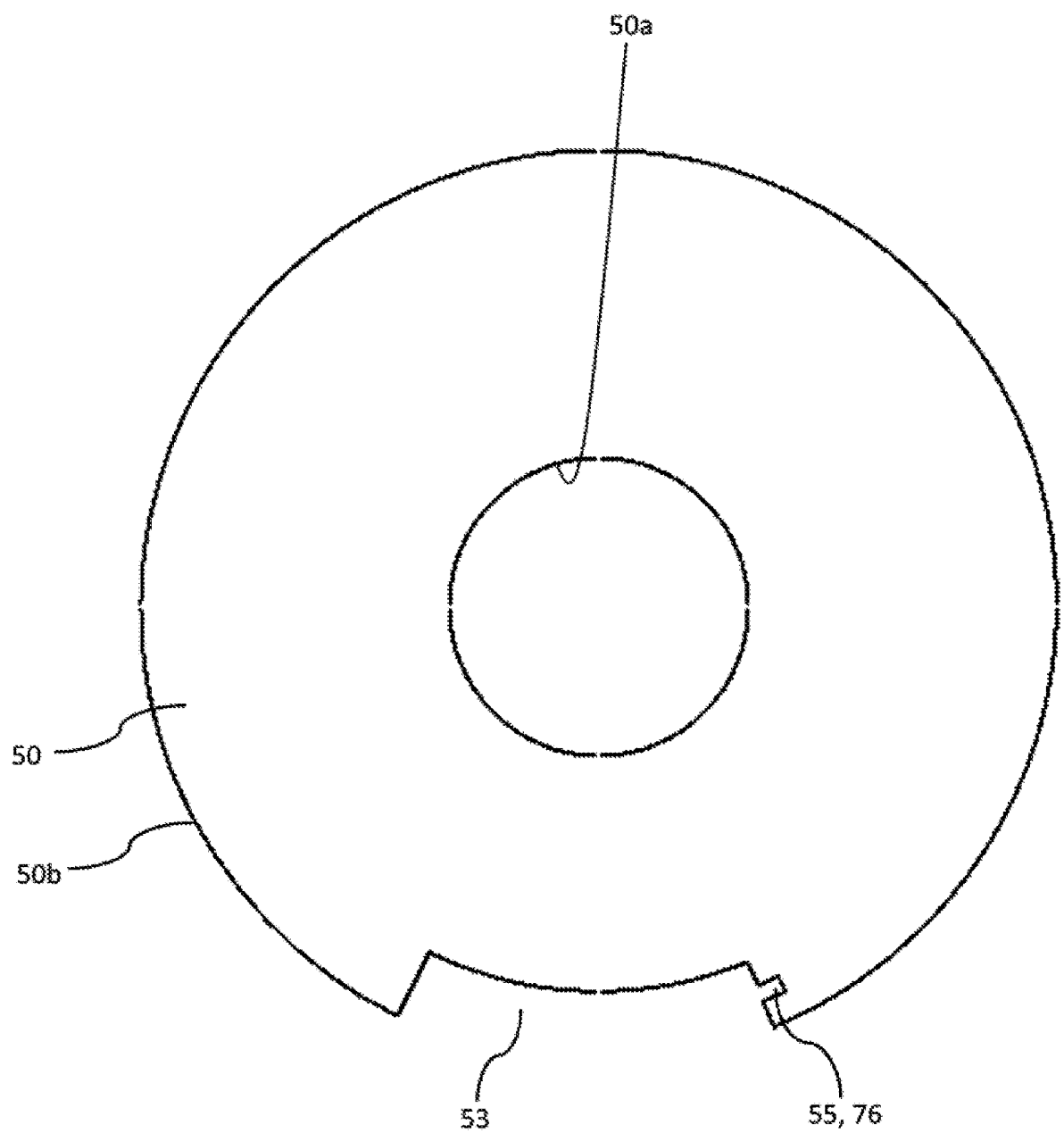
FIG. 15 is a plan view illustrating a bearing holder of an eighth modification of an example embodiment of the present disclosure.

FIG. 15 is a plan view illustrating the bearing holder 50 according to an eighth modification of the present invention. As illustrated in FIG. 15, the coil lead wire supporting member 70 of the eighth modification circumferentially includes a protrusion 76. The bearing holder 50 has a recess at a circumferential position opposite to the protrusion 76. In the eighth modification, the protrusion 76 of the coil lead wire supporting member 70 and the recess 55 of the bearing holder 50 are circumferentially fitted to each other. Consequently, the coil lead wire supporting member 70 and the bearing holder 50 are firmly fixed to each other.

In the motor 1 of the eighth modification, the coil lead wire supporting member 70 includes the protrusion, and the bearing holder 50 includes the recess fitted to the protrusion, so that the coil lead wire supporting member 70 and the bearing holder 50 can firmly be fixed to each other. Additionally, the coil lead wire supporting member 70 and the bearing holder 50 can easily be positioned.

Figure 16:
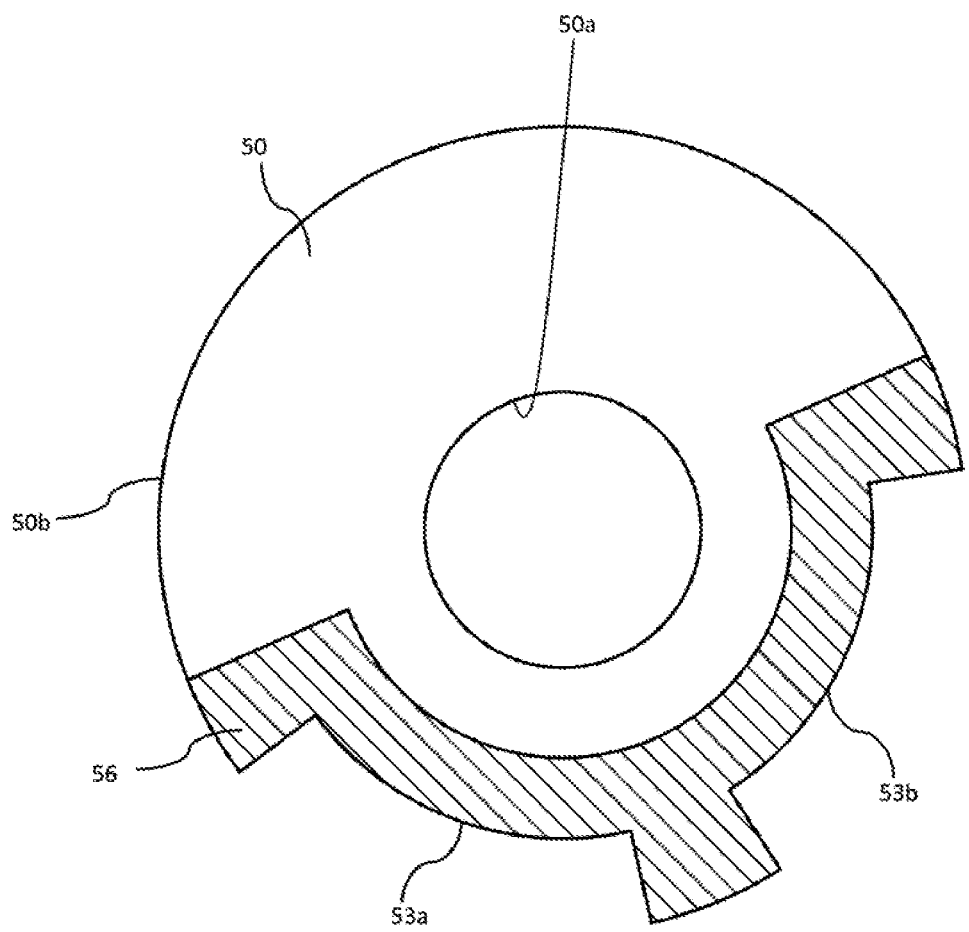
FIG. 16 is a plan view illustrating a bearing holder of a ninth modification of an example embodiment of the present disclosure.

FIG. 16 is a plan view illustrating the bearing holder 50 according to a ninth modification of the present invention. As illustrated in FIG. 16, the top surface of the bearing holder 50 includes a region 56 overlapping a region where the coil lead wire supporting member 70 is disposed in planar view. The region 56 protrudes upward from other regions of the bearing holder 50. The region 56 may be recessed downward with respect to other regions of the bearing holder 50. The region 56 may be formed into a step shape or a gently sloped shape.

In the motor 1 of the ninth modification, the region 56 protrudes or is recessed from other regions in the top surface of the bearing holder 50. Consequently, a height of the coil lead wire supporting member 70 can be changed according to a desired design condition.

The bearing holder may include a through-hole axially penetrating the bearing holder together with the notch having the above structure. In this case, desirably the coil lead wire passes through at least one of the through-hole and the notch. When viewed from the axial direction, not only the positions of the coil lead wires in the notch may circumferentially be arranged in a row, but also the positions may be radially arranged in at least two rows, and the positions are not particularly limited.

The embodiment and modifications of the present invention are specifically described above. The above description is merely an embodiment, and the scope of the present invention is not limited to the embodiment, but is broadly interpreted to an extent that those skilled in the art can grasp. For example, the embodiment and modifications can be implemented in combination with each other.

For example, the present invention can be applied to an in-vehicle motor for an electric power steering, a pump, and a compressor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
a rotor including a shaft centered on a center axis extending in one direction;
a stator surrounding the rotor around an axis and including a plurality of coils;
an upper bearing supporting an upper side of the shaft;
a lower bearing supporting a lower side of the shaft;
a bearing holder supporting the upper bearing;
a housing accommodating the rotor, the stator, and the bearing holder and including an opening on an upper side; and
a controller electrically connected to a plurality of coil lead wires, and having an electronic component mounted thereon; wherein
an outer circumferential surface of the bearing holder is fixed and contacts an inner circumferential surface of the housing; and
the bearing holder includes at least one notch extending inward from the outer circumferential surface, and at least one of the plurality of coil lead wires respectively extending from the plurality of coils extends upward through the at least one notch.

2. The motor according to claim 1, further comprising a coil lead wire support including a through-hole supporting each of the coil lead wires disposed in the notch and covering the notch.

3. The motor according to claim 2, wherein the through-hole of the coil lead wire support has a concentric arc shape.

4. The motor according to claim 2, wherein
the coil lead wire support includes a protrusion on a surface opposed to the bearing holder; and
the bearing holder includes a recess engaging with the protrusion.

5. The motor according to claim 2, wherein when a top surface of the bearing holder is viewed from above, a height of a region including a region overlapping the coil lead wire support is different from a height of other regions.

6. The motor according to claim 1, wherein all of the plurality of coil lead wires extend through the notch.

7. The motor according to claim 1, wherein the bearing holder includes a plurality of notches.

8. The motor according to claim 1, wherein the bearing holder includes a plurality of notches through which the plurality of coil lead wires extend.

9. The motor according to claim 1, wherein
the plurality of coil lead wires include six coil lead wires; and
the bearing holder includes a first notch through which first U-phase, V-phase, and W-phase coil lead wires of the six coil lead wires extend and a second notch through which second U-phase, V-phase, and W-phase coil lead wires of the six coil lead wires extend.

* * * * *